INVENTOR
LADDIE T. RHODES
BY Richard E. Reed
John E. Kidd
ATTORNEYS

INVENTOR
LADDIE T. RHODES

BY

ATTORNEYS

INVENTOR
LADDIE T. RHODES
BY John E. Kidd
ATTORNEYS

United States Patent Office 3,089,089

Patented May 7, 1963

3,089,089

POSITIVE COUNTDOWN CIRCUIT WITH DELAYED PULSE FEEDBACK GATING CLOCKED COINCIDENT CIRCUIT

Laddie T. Rhodes, Oxon Hill, Md.
(4622 Cedar Ridge Drive SE., Washington 21, D.C.)

Filed May 29, 1961, Ser. No. 113,561
3 Claims. (Cl. 328—40)
(Granted under Title 35, U.S. Code (1952), sec. 266)

The invention described herein may be manufactured and used by or for the Government of the United States of America for governmental purposes without the payment of any royalties thereon or therefor.

The present invention relates to a logic circuit for processing pulsed electrical energy and more particularly to an improved circuit for providing a stable positive countdown.

Many methods of providing a countdown of pulsed electrical energy are now in existence, but all appear to exhibit limited stability. In prior countdown circuits, as the count is increased, the pulses being processed begin to collect and cluster around the trigger level of the circuit thereby causing unwanted changes in the countdown ratio. This limitation of conventional logic pulse counters appears to be attributed to the direct reliance of the counters upon tube characteristics, transformer and biasing variation and various RC components, all of which cause instability in the output countdown signal. All of these factors besides causing instability in the circuit have a tendency to limit the countdown ratio that can be feasibly achieved. This is a serious drawback for conventional pulse counters because of the necessity for multiple stages, adding size, cost and complexity for a large countdown ratio.

This invention describes a practical method of providing a positive countdown that is as accurate as the clock being counted and capable of maintaining a known phase relation and/or timing with the clock. The circuit involves triggering a blocking oscillator, causing an output pulse to be developed and at the same time delaying the output pulse for approximately the length of the count and using the delayed pulse for purposes of providing a gate for retriggering the blocking oscillator by the clock pulse.

Accordingly, it is an object of this invention to provide a positive countdown circuit capable of a high ratio of stable accurate countdown.

It is also an object of the invention to provide a novel pulse counter circuit of simple design which incorporates a circuit technique which guarantees proper operation regardless of variations in the input clock signal but without limiting the effectiveness of the counting circuit.

It is a further object of this invention to provide a positive countdown circuit that is not directly dependent upon circuit parameters such as RC time constants, tube and biasing variation and yet provide a countdown that may be varied as desired.

Yet another object of this invention is to provide a countdown logic circuit that is positive, stable and accurate even as the respective pulses of the clock being processed may vary and still provide a variable countdown ratio.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figures 1, 2, 4:
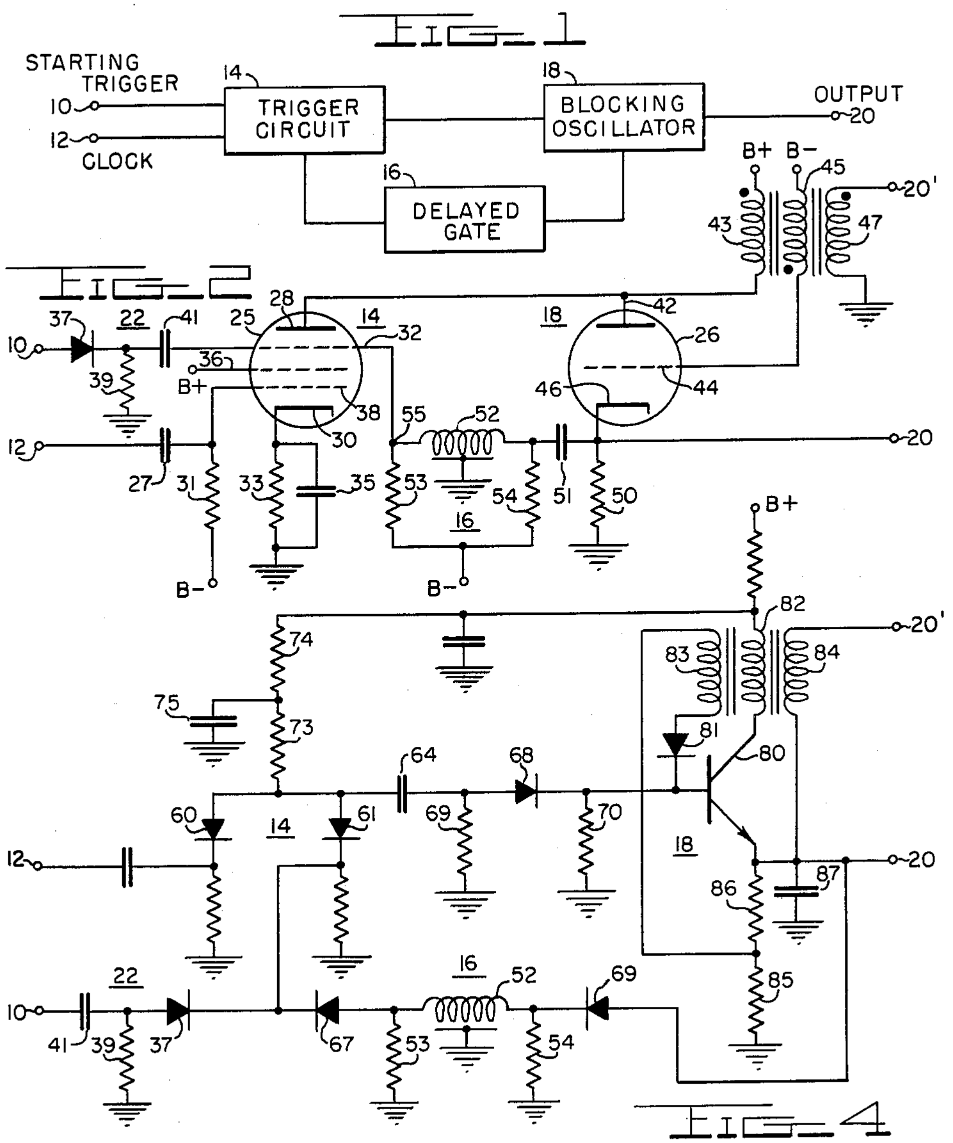
FIG. 1 is a block diagram of the basic components of the positive countdown circuit, according to the principles of this invention.
FIG. 2 is a circuit diagram of a vacuum tube version of a preferred logic circuit in accordance with this invention.
FIG. 4 is another circuit diagram of a transistorized version of a preferred counter in accordance with this invention.

FIGS. *5a, b, c, d, e, f, g* and *h* are a graphic representation of the voltages developed at certain points in the positive countdown circuit of FIG. 2 and plotted with respect to the same time base.

Figure 6:
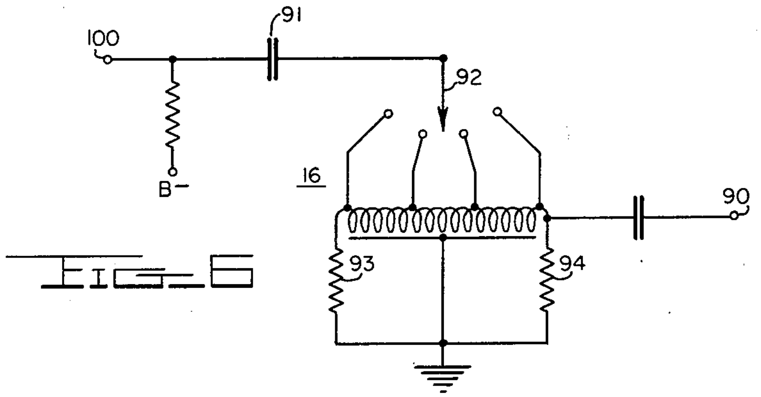

FIG. 6 is a circuit diagram of a preferred embodiment for providing a variable countdown ratio.

Figure 7:
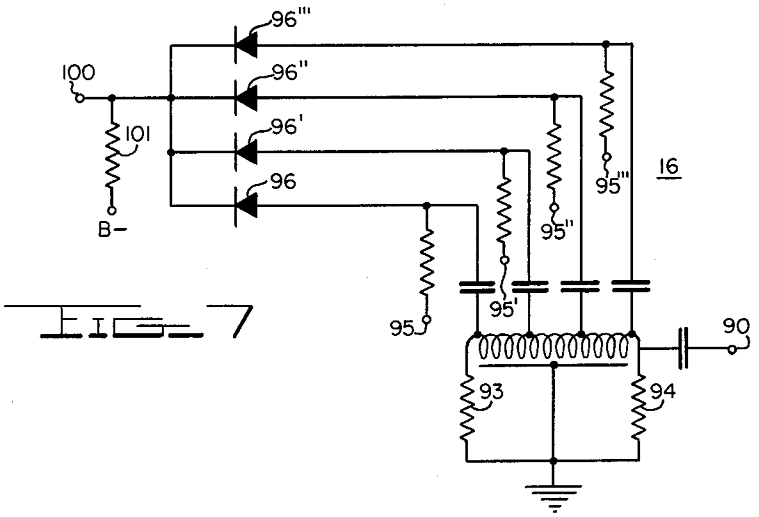

FIG. 7 is another circuit diagram employing biased diodes and a tapped delay line for varying the countdown ratio.

Figure 8:
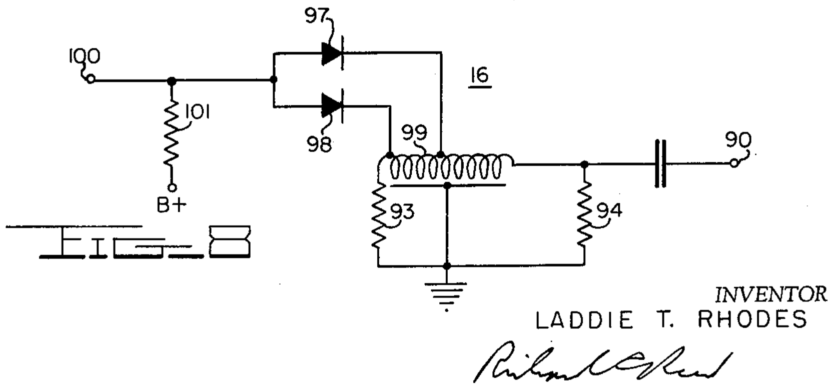

FIG. 8 is a circuit diagram showing a delay circuit for varying the width or duration of the gate.

Referring now to the drawings, wherein like reference characters designate like or corresponding parts throughout the several views, there is shown in FIG. 1 a block diagram of a logic circuit for performing a positive countdown. Here a clock signal to be counted is applied to trigger circuit 14 at terminal 12. Also being applied to trigger circuit 14, at terminal 10, is another clock signal for gating circuit 14 into conduction state. Trigger circuit 14 in turn causes blocking oscillator 18 to generate a positive output pulse at terminal 20. At the same time an output pulse is developed across terminal 20, the same pulse is processed by delay apparatus 16 causing a delayed gate signal to be applied to trigger circuit 14, thus being employed as the gating pulse, retriggering circuit 14.

FIG. 2 shows a preferred embodiment of this invention employing vacuum tubes 25 and 26. Tube 25 serves as a pentagrid type trigger tube having a plate electrode 28, cathode electrode 30, suppressor grid 32, screen grid 36 and control grid 38, but it should be appreciated that other types of electron tubes may be employed. In this application only requirement imposed is that the tube function as a coincidence circuit having two inputs. The cathode electrode 30 is connected to ground by bias resistor 33 and bypass capacitor 35. Tube 25 is initially held in its cut-off state by negatively biasing with respect to cathode 30, control grid 38 and suppressor grid 32. Control grid 38 is biased by resistor 31 and a negative source while screen grid 36 is positively biased and suppressor grid 32 is held at cut-off. The clock pulse train to be counted is impressed on control grid 38 by coupling capacitor 27. A gate or starting trigger for the circuit is impressed on suppressor grid 32 by developing a positive spike at differentiating circuit 22 comprising diode 37, resistor 39 and coupling capacitor 41. The plate 28 of tube 25 is connected to the plate 42 of triode tube 26. Both plates are polarized by means of winding 43 of transformer 45. Triode tube 26 is connected as a blocking oscillator with the output taken at either the cathode 46 or winding 47 of transformer 45. Mutual inductance feedback from anode 42 to grid 44 is provided by transformer 45. Cathode 46 is loaded by resistor 50 which may also serve as an output load for output tap 20. Cathode 46 is also connected to delay network 16 by coupling capacitor 51. Delay network 16 comprises an inductance 52 which is loaded by terminating resistors 53 and 54 and negative source for preventing reflection in line 52. The pulse developed at junction 55 is then impressed on suppressor grid 32.

Figure 5:
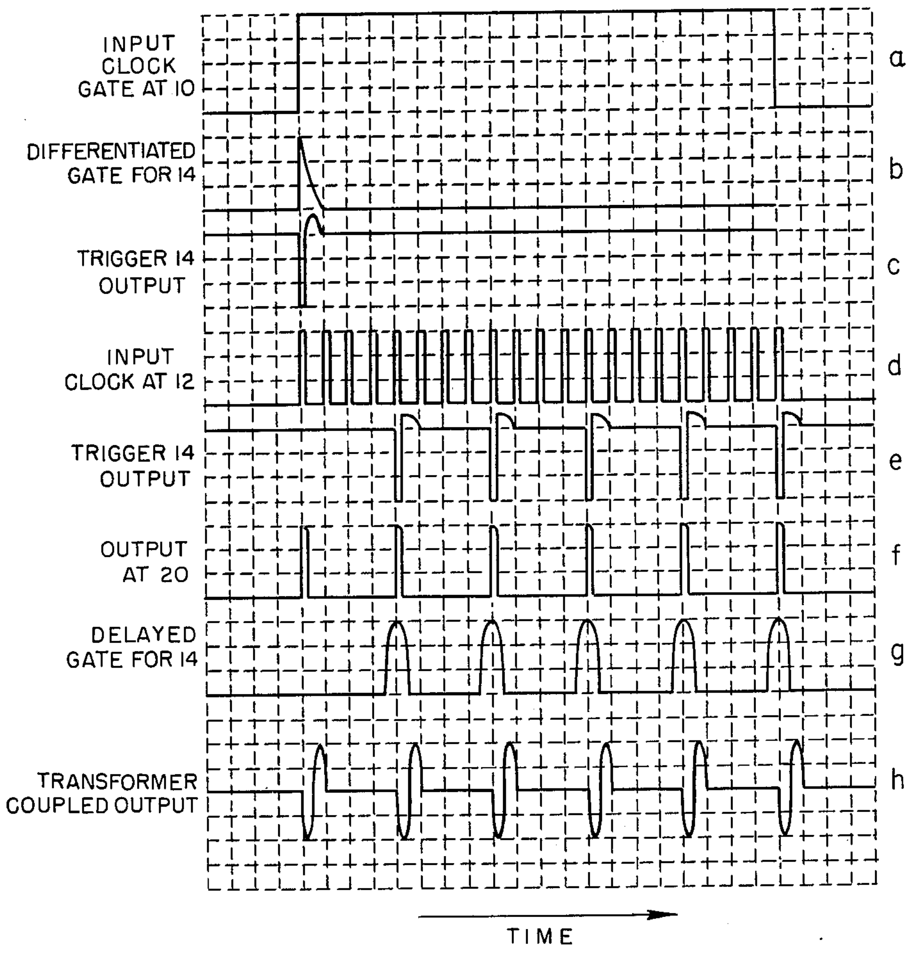

FIG. 5 depicts a 4:1 countdown and the various pulse formations that are developed at certain stages of the countdown circuit when a 1 mc. clock, such as shown in FIG. 5d is applied at terminal 12.

Considering now the operation of the positive countdown circuit shown in FIG. 2 for performing a 4:1 countdown of a 1 mc. clock such as shown in FIG. 5d, the trigger tube 25 will be assumed to be in a non-conducting or cut off state. This is due to the lack of sufficient positive potential on suppressor grid 32 and the voltage applied to resistor 31 which biases grid 38 sufficiently so as to prevent conduction between grid 38 and cathode 30. If a train of positive pulses, as the clock of FIG. 5d, is impressed on terminal 12, the potential of control grid 38 is raised sufficiently to cause tube 25 to conduct, but since circuit 14 is also a coincidence circuit, the proper bias must also be applied to suppressor grid 32. The proper bias is applied to suppressor grid 32 by applying an initial gate that is simultaneous with the first clock pulse of the train being counted as shown in FIG. 5a. The leading edge of the initial gate is differentiated by circuit 22, FIG. 5b, gating tube 25 into conduction and thereby causing a pulse such as FIG. 5c to be developed by trigger circuit 14. The output pulse from circuit 14 then triggers blocking oscillator 18, causing a positive pulse to be developed across resistor 50. It is well known in the art of blocking oscillators, that the output pulse obtained from a blocking oscillator will appear similar to the pulses shown in FIG. 5f. It should also be appreciated that the output could also be tapped at terminal 20 since when tube 26 is rendered conductive by a pulse from trigger circuit 14, it will draw plate current from the B+ power supply causing a magnetic field to be set up in transformer 45. The dots associated with the transformer indicate the windings are so situated that the dot end of the windings have the same polarity. Thus the current flow in winding 43 will induce a positive potential winding 47, the build up being in the same proportion as the flow of current to plate 42 thereby causing a positive output pulse.

The pulse developed across resistor 50 drives delay line 52 whose delay period determines the periodicity of output pulses and hence the countdown ratio of the circuit. For a 4:1 countdown as shown in FIG. 5, the delay line 52 would have an effective length of $4\mu$ seconds. The delayed pulse is then impressed upon suppressor grid 32, in with the clock applied to control grid 38 raising the grid 32 to a sufficiently high potential so as to allow trigger or gate tube 25 to conduct, although in some applications, it is advisable for the gate pulse to arrive at grid 32 slightly ahead of the clock pulses at grid 38. In the clock under consideration coincidence will occur when the fifth pulse of the clock is applied to control grid 38. Thus delay line 52 provides a stable and positive pulse of sufficient magnitude and with proper time occurrence for gating tube 25 into its conduction state. The gating pulse is as stable and accurate as the clock source since a delayed gating pulse is available for retriggering tube 25 only when blocking oscillator 26 generates a positive pulse and oscillator 26 is dependent for firing upon the clock being processed. If a carefully constructed delay circuit is used countdowns of 50 to 100:1 are available and they are just as accurate as 4:1 countdown, since there is as compared to conventional circuits only one gating pulse that is available at the trigger level of trigger tube 25. The countdown is not directly dependent upon any biasing variations that may be impressed upon the various electrodes of tubes 25 and 26 nor are there any critical time constants involved except those of the delay line, itself. It should also be appreciated that the individual pulses of the clock applied at terminal 12 may vary in width since generally the width of the gating pulse from delay circuit 16 will be many times wider than the width of the respective clock pulses thereby alleviating the possibility of an unexpected variation in the clock pulse causing an inadequate potential on grid 38 when grid 32 is gated. All that is necessary for this circuit to perform a countdown is for control grid 38 and suppressor grid 32 to be at a predetermined potential during the same effective period of time.

Figure 3:
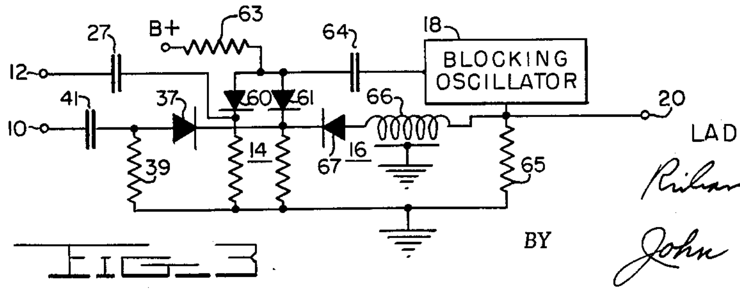
FIG. 3 is a circuit diagram of this invention employing a diode triggering circuit.

The logical structure of FIG. 3 shows a diode AND gate circuit for triggering blocking oscillator 18. Here the trigger circuit 14 includes diodes 60 and 61 which are forward biased by the B+ source and resistor 63. When a gate or initial substitute delayed pulse is applied to terminal 10 in coincidence with a pulse of the clock applied to terminal 12, the diodes will be driven into a non-conducting state, causing a positive pulse to be developed across resistor 63. The pulse developed across resistor 63 is coupled by capacitor 64 to blocking oscillator 18 causing the oscillator to fire and a positive output pulse to appear across resistor 65. The output pulse is then used for driving a delay circuit 16 comprising delay line 66 and isolating diode 67. Of course if delay line 66 becomes reflective each side of the line may be loaded by appropriate resistors. After a predetermined time period and in proper time occurrence so as to coincide with the clock, the delayed pulse is impressed on the cathode of diode 61, causing diodes 60 as well as 61 to be turned off which in turn causes blocking oscillator 18 to fire again. It should be noted here that in order to fire blocking oscillator 18, the pulse required to gate trigger circuit 14 must be of a proper amplitude and time occurrence.

In the circuit of FIG. 4, there is shown a semiconductor version of the positive count-down circuit of FIG. 2. Here a diode logic circuit similar to the diode circuit shown in FIG. 3 is used for triggering transistor 80 whose circuitry operates as a blocking oscillator 18.

If a proper initial pulse and clock are applied to terminals 10 and 12 respectively, the pulse developed across resistor 73 will be coupled by capacitor 64 and isolating diode 68 to the base of transistor 80. Resistor 69 acts as a D.C. return for capacitor 64 while resistor 70 provides a load for diode 68. Transistor 80 performs in the well known manner as a NPN type blocking oscillator causing an output pulse to be developed at 20 and 20'. To provide regenerative feedback for the oscillator, a transformer is provided having primary winding 82 and a secondary winding 83. The secondary winding 83 is serially connected between diode 81 and a resistor 85 which is connected to a point of reference potential or ground for the circuit. Diode 81 is used for coupling between the base and secondary winding 83 rather than a capacitor because of the better stability obtained. Capacitor 87 and resistor 86 are employed as a conventional time constant network, stabilizing the operation of the blocking oscillator.

The output pulse developed across the output load is also delivered to delay circuit 16 by means of diode 69, with resistors 53 and 54 again being used at each end of delay line 52 so as to prevent reflection. The delayed output pulse is then impressed on diode 61 by isolating diode 67, gating trigger circuit 14 into its cut-off state thereby causing blocking oscillator 18 to fire. The combination of capacitor 75 and resistances 73 and 74 provide a filtering network for providing a steady and constant potential at the junction of resistances 73 and 74.

Turning now to FIGS. 6, 7 and 8, each figure represents a different embodiment of a delay gating circuit 16 capable of being used with this invention. In employing these circuits the output pulse from blocking oscillator 18 is impressed upon terminal 90 and after being processed by circuit 16, the pulse is coupled to trigger circuit 14 at terminal 100, gating trigger circuit 14 so as to provide a pulse to fire blocking oscillator 18.

More specifically, in FIG. 6, an adjustable arm 92, coupled to terminal 100 by capacitor 91, is provided for tapping the delay line at various points along its effective length thereby allowing the timing of the gating pulse to be variable.

While varying the timing as in FIG. 6 provides a versatile countdown circuit, a delay circuit as shown in FIG. 7 is in some applications even more desirable since both the timing and amplitude of the gating pulse for trigger circuit 14 may be varied. This circuit would be especially useful if coupled to the diode AND gate shown in FIG. 3 for firing block-oscillator 18 since the input pulse of shortest duration (width) determines the output pulse width from circuit 14 or if input pulses of different amplitudes are used, the output amplitude will correspond to the amplitude of the smaller pulse. In FIG. 7, the countdown ratio is determined by the pattern in which potential is applied to terminals 95. Thus by applying a gate of proper potential to terminals 95, the count can be varied in discrete jumps or any desired selected rates, even in random fashion.

In FIG. 8 there is shown another delay circuit, primarily intended as a circuit for shortening the gating pulse to conform to the countdown ratio of the circuit but it should be appreciated that if the diodes 97 and 98 were reversed and a negative source of potential supplied to resistor 101 the gating pulse will be stretched or lengthened. An example of the waveform available for gating trigger circuit 14 is shown in FIG. 5*g*.

It should be emphasized that the ratio of countdown is not dependent upon the count as conventional circuits but remains constant for 4:1 or 100:1.

While the trigger circuit shown in FIGS. 2, 3 and 4 requires both a clock at terminal 12 and a clock gate at terminal 10 in order to initially fire blocking oscillator 18, by biasing grid 32 so as not to prevent tube 25 from conducting, circuit 22 and terminal 10 can be alleviated. In this embodiment, the first positive pulse of the clock will cause blocking oscillator 18 to fire. Now by driving the delay line by the negative swing developed at terminal 20', noting FIG. 5*h*, the delayed negative pulse may then be impressed upon the suppressor grid 32 thereby inhibiting the next clock pulse. By providing a multiple tapped delay such as in FIG. 7 but with inverted diodes, inhibiting pulses representative of the countdown desired, may be impressed on grid 32, driving tube 25 into a non-conducting state and inhibiting the clock pulses applied at terminal 10.

When desired an amplifier or other processing components can be added to the delay circuit 16 to extend or modify the performance of the countdown circuit.

Although this invention has been described with reference to particular embodiments thereof it should not be deemed limited to these arrangements since many other embodiments and modifications will be apparent to those skilled in the art without departing from either the spirit or the scope of the invention.

What is claimed is:

1. A pulse countdown circuit comprising,
blocking oscillator means for generating a pulse,
means for producing a delayed pulse in response to said blocking oscillator pulse, the amount of delay being substantially equal to the desired period of the counted-down output,
means to trigger said blocking oscillator,
means for applying clock pulses to be counted-down to said means to trigger,
means for blocking said means to trigger to inhibit triggering of the blocking oscillator except in response to a clock pulse occurring in coincidence with a delayed pulse,
and means for providing an initial substitute delayed pulse to initiate operation of the circuit for subsequent recurrent operation resultant to coincident delayed pulses and clock pulses.

2. A positive countdown circuit comprising,
a pulse generator for producing pulses of selected duration in response to clock pulses,
means responsive to pulse generator output for producing time delayed pulses, the amount of time delay being substantially equal to the period desired of the counted down ouptut,
means for producing clock pulses to be frequency divided,
means for delivering said clock pulses to said pulse generator,
means for blocking the delivery of clock pulses to the pulse generator except in coincidence with the time delayed pulses,
and means for providing an initial substitute delayed pulse to initiate operation of the circuit for subsequent recurrent operation resultant to coincident delayed pulses and clock pulses.

3. A positive countdown circuit comprising,
a pulse generator for producing pulses of selected duration in response to clock pulses,
means responsive to pulse generator output for producing time delayed pulses, the amount of time delay being substantially equal to the period desired of the counted down output,
means for producing clock pulses to be frequency divided,
means for delivering said clock pulses to said pulse generator,
and means for blocking the delivery of clock pulses to the pulse generator except those in coincidence with the time delayed pulses.

References Cited in the file of this patent

UNITED STATES PATENTS

| | | |
|---|---|---|
| 2,919,437 | Buie et al. | Dec. 29, 1959 |
| 2,923,898 | Goad | Feb. 2, 1960 |
| 2,996,674 | Narud et al. | Aug. 15, 1961 |